(12) United States Patent
Yoshimura et al.

(10) Patent No.: US 9,377,102 B2
(45) Date of Patent: Jun. 28, 2016

(54) AUTOMATIC TRANSMISSION FAILURE DETERMINATION APPARATUS

(71) Applicant: HONDA MOTOR CO., LTD., Tokyo (JP)

(72) Inventors: Yusuke Yoshimura, Wako (JP); Takuya Kurokawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/795,344

(22) Filed: Jul. 9, 2015

(65) Prior Publication Data
US 2016/0017987 A1 Jan. 21, 2016

(30) Foreign Application Priority Data
Jul. 16, 2014 (JP) .................................. 2014-146351

(51) Int. Cl.
*F16H 61/12* (2010.01)
*F16H 3/00* (2006.01)

(52) U.S. Cl.
CPC ................ *F16H 61/12* (2013.01); *F16H 3/006* (2013.01); *F16H 2061/1288* (2013.01); *F16H 2200/006* (2013.01)

(58) Field of Classification Search
CPC ............ F16H 61/12; F16H 2061/1224; F16H 2061/1288; F16H 3/006
See application file for complete search history.

(56) References Cited

U.S. PATENT DOCUMENTS

| 5,492,210 | A | * | 2/1996 | Eaton | .................... F16H 61/065 192/109 F |
| 2011/0056317 | A1 | * | 3/2011 | Sato | ........................ F16H 61/12 74/473.11 |
| 2011/0303040 | A1 | * | 12/2011 | Hagelskamp | ....... F16H 61/0206 74/473.11 |
| 2012/0304816 | A1 | * | 12/2012 | Yagi | .................... F16H 61/0021 74/665 B |

FOREIGN PATENT DOCUMENTS

JP 2013-189993 A 9/2013

* cited by examiner

*Primary Examiner* — Huan Le
(74) *Attorney, Agent, or Firm* — Squire Patton Boggs (US) LLP

(57) ABSTRACT

An apparatus for determining failure of an automatic transmission having gear engaging mechanisms engaging one of gears to input shafts and an output shaft, a first to third pressure-regulating valves, a first and second shift valves, and a failure determiner. The failure determiner energizes a solenoid valve to output a clutch pressure to one of the gear engaging mechanisms when the clutch pressure is less than a prescribed pressure, determines whether the one of the gear engaging mechanisms operates based on output of an operating state detector, and determines that the second pressure-regulating valve has failed when the one of the gear engaging mechanisms is determined to be inoperative.

7 Claims, 9 Drawing Sheets

FIG.4

| MODE | | SHIFT VALVES (CLUTCHES) | | CLUTCHES | | | SHIFT VALVES (GEARS) | | | GEAR ENGAGING MECHANISM | | | | | | | | NOTE |
|---|---|---|---|---|---|---|---|---|---|---|---|---|---|---|---|---|---|---|
| | | SHA | SHB | CL1 | CL2 | RVS | SHC | SHD | SHE | PS1 | PS3 | PS6 | PS8 | PS5 | PS7 | PS2 | PS4 | |
| A | 1 | x | x | A | B | x | x | x | x | x | C | x | x | D | x | x | x | ORDINARY CONDITION |
| | 2 | x | x | A | B | x | x | x | O | x | C | x | x | x | D | x | x | |
| | 3 | x | x | A | B | x | x | O | x | C | x | x | x | D | x | x | x | |
| | 4 | x | x | A | B | x | x | O | O | C | x | x | x | x | x | x | D | |
| | 5 | x | x | A | B | x | O | x | x | x | x | C | x | x | x | D | x | |
| | 6 | x | x | A | B | x | O | x | O | x | x | C | x | x | x | x | D | |
| | 7 | x | x | A | B | x | O | O | x | x | x | x | C | D | x | x | x | |
| | 8 | x | x | A | B | x | O | O | O | x | x | x | C | x | D | x | x | |
| B | 1 | x | O | A | x | x | x | x | x | x | C | x | x | x | x | x | x | LSD FAILED CONDITION (LSD OUTPUT PRESSURE IS SHUT OFF BY ENERGIZING SHB) |
| | 2 | x | O | A | x | B | x | x | O | x | C | x | x | x | x | x | x | |
| | 3 | x | O | A | x | x | x | O | x | C | x | x | x | x | x | x | x | |
| | 4 | x | O | A | x | B | x | O | O | C | x | x | x | x | x | x | x | |
| | 5 | x | O | A | x | x | O | x | x | x | x | x | B | x | x | x | x | |
| | 6 | x | O | A | x | x | O | x | O | x | x | C | B | x | x | x | x | |
| | 7 | x | O | A | x | x | O | O | x | x | x | C | x | x | x | x | x | |
| | 8 | x | O | A | x | x | O | O | O | x | x | x | C | x | x | x | x | |
| C | 1 | O | x | x | x | x | x | x | x | x | x | x | x | D | x | x | x | LSC FAILED CONDITION (LSC OUTPUT PRESSURE IS SHUT OFF BY ENERGIZING SHA) |
| | 2 | O | x | x | x | x | x | x | O | x | x | x | x | A | D | x | x | |
| | 3 | O | x | x | x | x | x | O | x | x | x | x | x | D | x | x | x | |
| | 4 | O | x | x | x | x | x | O | O | x | x | x | x | A | x | x | D | |
| | 5 | O | x | x | x | x | O | x | x | x | x | x | x | x | x | D | x | |
| | 6 | O | x | x | x | x | O | x | O | x | x | x | x | A | x | x | D | |
| | 7 | O | x | x | x | x | O | O | x | x | x | x | x | x | A | D | x | |
| | 8 | O | x | x | x | x | O | O | O | x | x | x | x | A | x | x | D | |

FIG.5

| SEQUENTIAL NO | | SEQ1 | | SEQ2 | | SEQ3 | |
|---|---|---|---|---|---|---|---|
| MODE | | CLUTCH CHECKING | | CONTROL ODD SPEED PISTON TO NEUTRAL | | CONTROL SPECIFIC SPEED PISTON TO IN-GEAR BY BACKUP PASSAGE | |
| OPERATION | | TURN ALL CLUTCHES OFF | | ODD SPEED PISTON | | 5-7 PISTON (BACKUP) | |
| MALFUNCTION | GEAR ENGAGING MECHANISMS | OTHER THAN LOW PRESSURE | LOW PRESSURE | IMMOVABLE | OPERATES | IMMOVABLE | MOVED BACKWARD | NORMAL |
| ODD CLUTCH LOW PRESSURE | N | EXCEPTION | - | EXCEPTION | - | | | |
| ODD CLUTCH LOW PRESSURE | 1 | EXCEPTION | - | (1)ABNORMAL | (1) NORMAL | (2) ABNORMAL | EXCEPTION | (2) NORMAL |
| ODD CLUTCH LOW PRESSURE | 3 | EXCEPTION | - | (1)ABNORMAL | (1) NORMAL | (2) ABNORMAL | EXCEPTION | (2) NORMAL |
| ODD CLUTCH LOW PRESSURE | 5 | EXCEPTION | - | EXCEPTION | - | (2) ABNORMAL | EXCEPTION | (2) NORMAL |
| ODD CLUTCH LOW PRESSURE | 7 | EXCEPTION | - | EXCEPTION | - | (2) ABNORMAL | EXCEPTION | (2) NORMAL |

(1) SHIFT VALVE (SHA)
(2) LINEAR SOLENOID VALVE (LSA)

| SEQ4 | | SEQ5 | | |
|---|---|---|---|---|
| CONTROL SPECIFIC SPEED PISTON TO NEUTRAL | | CONTROL OTHER SPEED PISTON TO IN-GEAR BY NORMAL PASSAGE | | |
| 5-7 PISTON | | 1-3 PISTON | | |
| IMMOVABLE | OPERATES | IMMOVABLE | MOVED BACKWARD | NORMAL |
| EXCEPTION | - | (1) ABNORMAL | EXCEPTION | (1) NORMAL |
| -※ | -※ | -※ | -※ | -※ |
| -※ | -※ | -※ | -※ | -※ |
| EXCEPTION | - | (1) ABNORMAL | EXCEPTION | (1) NORMAL |
| EXCEPTION | - | (1) ABNORMAL | EXCEPTION | (1) NORMAL |

FIG.6

| SEQUENTIAL NO | | SEQ1 | | | SEQ2 | | SEQ3 | | |
|---|---|---|---|---|---|---|---|---|---|
| MODE | | CLUTCH CHECKING | | | CONTROL EVEN SPEED PISTON TO NEUTRAL | | CONTROL SPECIFIC SPEED PISTON TO IN-GEAR BY BACKUP PASSAGE | | |
| OPERATION | | TURN ALL CLUTCHES OFF | | | EVEN SPEED PISTON | | 6-8 PISTON (BACKUP) | | |
| MALFUNCTION | GEAR ENGAGING MECHANISMS | OTHER THAN LOW PRESSURE | LOW PRESSURE | | IMMOVABLE | OPERATES | IMMOVABLE | MOVED BACKWARD | NORMAL |
| EVEN CLUTCH LOW PRESSURE | N | EXCEPTION | - | | EXCEPTION | - | (2) ABNORMAL | EXCEPTION | (2) NORMAL |
| EVEN CLUTCH LOW PRESSURE | 2 | EXCEPTION | - | | (1) ABNORMAL | (1) NORMAL | (2) ABNORMAL | EXCEPTION | (2) NORMAL |
| EVEN CLUTCH LOW PRESSURE | 4 | EXCEPTION | - | | (1) ABNORMAL | (1) NORMAL | (2) ABNORMAL | EXCEPTION | (2) NORMAL |
| EVEN CLUTCH LOW PRESSURE | 6 | EXCEPTION | - | | EXCEPTION | - | (2) ABNORMAL | EXCEPTION | (2) NORMAL |
| EVEN CLUTCH LOW PRESSURE | 8 | EXCEPTION | - | | EXCEPTION | - | (2) ABNORMAL | EXCEPTION | (2) NORMAL |

(1) SHIFT VALVE (SHB)
(2) LINEAR SOLENOID VALVE (LSB)

| SEQ4 | | | SEQ5 | | |
|---|---|---|---|---|---|
| CONTROL SPECIFIC SPEED PISTON TO NEUTRAL | | | CONTROL OTHER SPEED PISTON TO IN-GEAR BY NORMAL PASSAGE | | |
| 6-8 PISTON | | | 2-4 PISTON | | |
| IMMOVABLE | OPERATES | | IMMOVABLE | MOVED BACKWARD | NORMAL |
| EXCEPTION | - | | (1) ABNORMAL | EXCEPTION | (1) NORMAL |
| -※ | -※ | | -※ | -※ | -※ |
| -※ | -※ | | -※ | -※ | -※ |
| EXCEPTION | - | | (1) ABNORMAL | EXCEPTION | (1) NORMAL |
| EXCEPTION | - | | (1) ABNORMAL | EXCEPTION | (1) NORMAL |

# AUTOMATIC TRANSMISSION FAILURE DETERMINATION APPARATUS

CROSS-REFERENCE TO RELATED APPLICATION

This application is based upon and claims the benefit of priority from Japanese Patent Application No. 2014-146351 filed on Jul. 16, 2014, the contents of which are incorporated herein by reference.

BACKGROUND OF THE INVENTION

1. Field of the Invention

This invention relates to an automatic transmission failure determination apparatus, specifically to an apparatus for determining failure of an electromagnetic valve (solenoid valve) of a hydraulic pressure supply circuit or the like in a double-clutch (twin-clutch) automatic transmission.

2. Description of Related Art

As an example of a double-clutch automatic transmission can be cited the one described in Patent Document 1 (Japanese Laid-Open Patent Application No. 2013-189993). The double-clutch automatic transmission set out in Patent Document 1 comprises input shafts connected through clutches to an engine or other power source mounted on a vehicle, an output shaft installed parallel to the input shafts, and a plurality of gear engaging mechanisms capable of establishing one among first to eighth speed gears by engaging one of the gears interposed between the input shaft and output shaft with the input shaft and the output shaft, and is equipped with a hydraulic pressure supply circuit having a line pressure-regulating valve for pressure-regulating hydraulic pressure discharged from an oil pump to line pressure, a plurality of pressure-regulating valves installed downstream of the line pressure-regulating valve, and a plurality of select valves for selectively supplying pressure-regulated hydraulic pressure to the gear engaging mechanisms, wherein the valves comprise electromagnetic valves.

SUMMARY OF THE INVENTION

When a failure arises that causes clutch pressure low in a double-clutch automatic transmission of this type, since the conceivable failure sites can not necessarily limited to valves that pressure-regulate the clutch pressure but diverge into many sites, it becomes difficult to identify the actual source from among the various possibilities. This has sometimes made it difficult to promptly implement remedial action.

The object of this invention is therefore to overcome the aforesaid problem by providing an automatic transmission failure determination apparatus that can promptly and efficiency identify the source the failure when a low clutch pressure failure arise.

In order to achieve the object, this invention provides an apparatus for determining failure of an automatic transmission, comprising: input shafts that input rotation of a prime mover mounted on a vehicle through a pair of clutches; an output shaft arranged in parallel to the input shafts; gear engaging mechanisms that engage one of gears to the input shafts and the output shaft to establish one of speeds corresponding to the engaged one of the gears; a first pressure-regulating valve that pressure-regulates hydraulic pressure discharged from an oil pump to line pressure; a second pressure-regulating valve that pressure-regulates the line pressure regulated by the first pressure-regulating valve to clutch engaging pressure for the clutches; a third pressure-regulating valve that pressure-regulates the line pressure regulated by the first pressure-regulating valve to gear pressure for the gear engaging mechanisms; a first shift valve that has a solenoid valve and outputs the clutch pressure regulated by the second pressure regulating valve and the gear pressure regulated by the third pressure regulating valve toward the clutches and the gear engaging mechanisms when the solenoid valve is de-energized, while outputting the clutch pressure regulated by the second pressure-regulating valve toward one of the gear engaging mechanisms through a first oil passage when the solenoid valve is energized; a second shift valve that is installed downstream of the first shift valve in hydraulic supply and selectively supplies the gear pressure outputted from the first shift valve to the gear engaging mechanisms through a second oil passage that is different from the first oil passage; an operating state detector that detects operating state of the gear engaging mechanisms; a pressure detector that detects the clutch pressure regulated by the second pressure-regulating valve; and a failure determiner that energizes the solenoid valve to output the clutch pressure to the one of the gear engaging mechanisms through the first oil passage when the clutch pressure detected by the pressure detector is less than a prescribed pressure, determines whether the one of the gear engaging mechanisms operates based on output of the operating state detector, determines that the second pressure-regulating valve has failed when the one of the gear engaging mechanisms is determined to be inoperative, whereas determines that at least one of the solenoid valve and the pressure detector has failed when the one of the gear engaging mechanisms is determined to be operative.

BRIEF DESCRIPTION OF THE DRAWINGS

The above and other objects and advantages will be more apparent from the following description and drawings, in which:

FIG. 4 is an explanatory diagram showing an operating mode of the hydraulic pressure supply circuit shown in FIG. 2;

FIG. 5 is a sequence diagram showing the operation of the apparatus shown in FIG. 1 with reference to the odd-numbered speed side;

FIG. 6 is a similar sequence diagram showing the operation of the apparatus shown in FIG. 1 with reference to the even-numbered speed side;

DETAILED DESCRIPTION OF THE INVENTION

An automatic transmission failure determination apparatus according to this invention is explained with reference to the attached drawings in the following.

Figure 1:
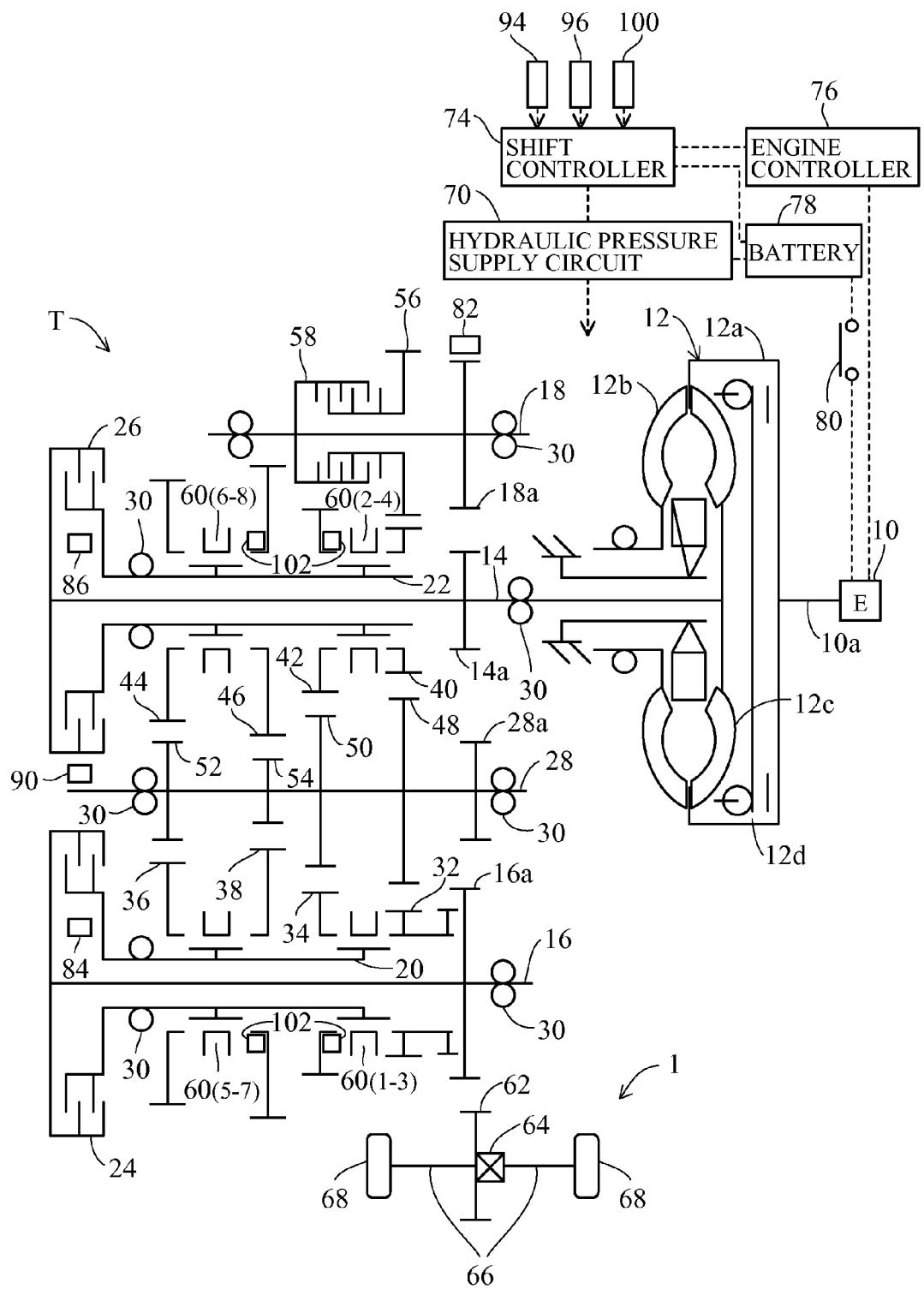
FIG. 1 is an overall schematic view of an automatic transmission failure determination apparatus according to an embodiment of this invention.

FIG. 1 is an overall schematic view of an automatic transmission failure determination apparatus according to an embodiment of this invention.

Now to explain, reference numeral 1 designates a vehicle, and the vehicle 1 is equipped with an automatic transmission (sometimes called "transmission" hereinafter) T. The transmission T is a double-clutch (twin-clutch) transmission with 8 forward-speed gears and 1 reverse-speed gear and has P, R, N and D ranges, for example.

The transmission T is connected through a torque converter 12 to a driveshaft 10a connected to a crankshaft of an engine (prime mover) 10, and is equipped with an even-numbered speed (2, 4, 6 and 8 speed) input shaft (second input shaft) 14 and with an odd-numbered speed (1, 3, 5 and 7 speed) input shaft (first input shaft) 16 parallel to the even-numbered speed input shaft 14. The engine 10 comprises, for example, a gasoline-fueled, spark-ignition internal combustion engine.

The torque converter 12 has a pump impeller 12b fixed on a drive plate 12a directly connected to the driveshaft 10a of the engine 10, a turbine runner 12c fixed on the even-numbered speed input shaft 14, and a lock-up clutch 12d, whereby the driving force (rotation) of the engine 10 is inputted to the even-numbered speed input shaft 14 through the torque converter 12.

An idler shaft 18 is provided in parallel with the even-numbered speed input shaft 14 and odd-numbered speed input shaft 16. The even-numbered speed input shaft 14 is connected to the idler shaft 18 through gears 14a, 18a, and the odd-numbered speed input shaft 16 is connected to the idler shaft 18 through gears 16a, 18a, whereby the even-numbered speed input shaft 14, the odd-numbered speed input shaft 16, and idler shaft 18 rotate together with the rotation of the engine 10.

Further, a first auxiliary input shaft 20 and a second auxiliary input shaft 22 are concentrically installed on the peripheries of the odd-numbered speed input shaft 16 and the even-numbered speed input shaft 14 to be rotatable relative thereto.

The odd-numbered speed input shaft 16 and first auxiliary input shaft 20 are connected through a first clutch (CL1) 24 for odd-numbered speeds and input rotation of the engine 10 through the first clutch 24, while the even-numbered speed input shaft 14 and the second auxiliary input shaft 22 are connected through a second clutch (CL2) 26 for even-numbered speeds and input rotation of the engine 10 through the second clutch 26.

The first and second clutches 24 and 26 comprise both wet multi-plate clutches that operate when supplied with working oil pressure (hydraulic pressure). When the first and second clutches 24 and 26 are supplied with hydraulic pressure and engage (mesh), the first and second auxiliary input shafts 20 are transmitted to the odd-numbered speed and even-numbered speed shafts.

An output shaft 28 is installed between and in parallel with the even-numbered speed input shaft 14 and odd-numbered speed input shaft 16. The even-numbered speed input shaft 14, odd-numbered speed input shaft 16, idler shaft 18 and output shaft 28 are rotatably supported by bearings 30.

On the first auxiliary input shaft 20 on the odd-numbered speed side are fixed a first-speed drive gear 32, a third-speed drive gear 34, a fifth-speed drive gear 36 and a seventh-speed drive gear 38, and on the second auxiliary input shaft 22 on the even-numbered speed side are fixed a second-speed drive gear 40, a fourth-speed drive gear 42, a sixth-speed drive gear 44 and an eighth-speed drive gear 46.

On the output shaft 28 are fixed a first-second speed driven gear 48 that meshes with the first-speed drive gear 32 and second-speed drive gear 40, a third-fourth speed driven gear 50 that meshes with the third-speed drive gear 34 and fourth-speed drive gear 42, a fifth-sixth speed driven gear 52 that meshes with the fifth-speed drive gear 36 and sixth-speed drive gear 44, and a seventh-eighth speed driven gear 54 that meshes with the seventh-speed drive gear 38 and eighth-speed drive gear 46.

The idler shaft 18 rotatably supports an RVS (reverse) idler gear 56 that meshes with the first-second speed driven gear 48 fixed on the output shaft 28. The idler shaft 18 and the RVS idler gear 56 are connected through an RVS clutch 58. Like the first and second clutches 24 and 26, the RVS clutch 58 is also a wet multi-plate clutch that operates when supplied with hydraulic pressure.

On the odd-numbered speed input shaft 16 are provided a first-third speed gear engaging mechanism 60(1-3) that selectively engages (fixes) the first-speed drive gear 32 and the third-speed drive gear 34 with the first auxiliary input shaft 20, and a fifth-seventh speed gear engaging mechanism 60(5-7) that selectively engages (fixes) the fifth-speed drive gear 36 and the seventh-speed drive gear 38 with the first auxiliary input shaft 20.

On the even-numbered speed input shaft 14 are provided a second-fourth speed gear engaging mechanism 60(2-4) that selectively engages (fixes) the second-speed drive gear 40 and the fourth-speed drive gear 42 with the second auxiliary input shaft 22, and a sixth-eighth speed gear engaging mechanism 60(6-8) that selectively engages (fixes) the sixth-speed drive gear 44 and the eighth-speed drive gear 46 with the second auxiliary input shaft 22. The four gear engaging mechanisms are hereinafter designated collectively by reference symbol 60.

Although not shown in the drawings, two opposed piston chambers corresponding to associated speed gears are provided in each of the four gear engaging mechanisms 60 and linked by a common piston rod (piston) so as to establish a desired speed gear when supplied with hydraulic pressure to the piston chamber on the opposite side, e.g., the first-third speed gear engaging mechanism 60(1-3) is configured to establish third speed when supplied with hydraulic pressure to a third-speed piston chamber.

Although not shown, shift forks are connected to the piston rods. The shift fork is fixed on a fork shaft on which detents (not shown) are drilled at locations corresponding to a central neutral position and left and right in-gear (engaged or meshed) positions. With this, the shift fork can be retained by a detent so that supply of hydraulic pressure is made unnecessary when in the neutral and left/right in-gear positions.

The shift fork is connected to an annular sleeve, and a spline-fitted hub is provided on the inner peripheral side of the sleeve to be movable in the axial direction of the first and second auxiliary input shafts 20, 22. The configuration is such that when the hub moves axially away from the center neutral position, it meshes through a synchronizer ring or the like with dog teeth of the associated drive gear 32, 34, 36, 38, 40, 42, 44, 46 so as to engage the drive gear 32, for example, with the first and second auxiliary input shafts 20, 22.

When the first clutch 24 or the second clutch 26 is engaged (meshed), the driving force of the engine 10 is transmitted from the odd-numbered speed input shaft 16 to the first auxiliary input shaft 20 or from the even-numbered speed input shaft 14 to the second auxiliary input shaft 22 and further to the output shaft 28 through the aforesaid drive gears and driven gears.

During reverse operation, the driving force of the engine 10 is transmitted to the output shaft 28 through the even-numbered speed input shaft 14, gear 14a, gear 18a, idler shaft 18, RVS clutch 58, RVS idler gear 56, and first-second speed driven gear 48. The output shaft 28 is connected to a differential mechanism 64 through a gear 62, and the differential mechanism 64 is connected to wheels (drive wheels) 68 through drive shafts 66. The vehicle 1 is represented by wheels 68 among other components.

Thus, the automatic transmission T comprises a double-clutch automatic transmission having the input shafts 14, 16, 20, 22 that input rotation of the engine 10 through the first and second clutches 24, 26, the output shaft 28 arranged in parallel to the input shafts, and the gear engaging mechanisms 60 in m number that engage one of gears 32-54 to the input shafts and the output shaft to establish one of speeds corresponding to the engaged one of the gears from among n (n: 2m) number of speeds.

All of the gear engaging mechanisms 60 are operated when supplied with hydraulic pressure (producing shifting force). A hydraulic pressure supply circuit 70 is provided for supplying hydraulic pressure to the gear engaging mechanisms, first and second clutches 24 and 26, and RVS clutch 58.

Figure 2:
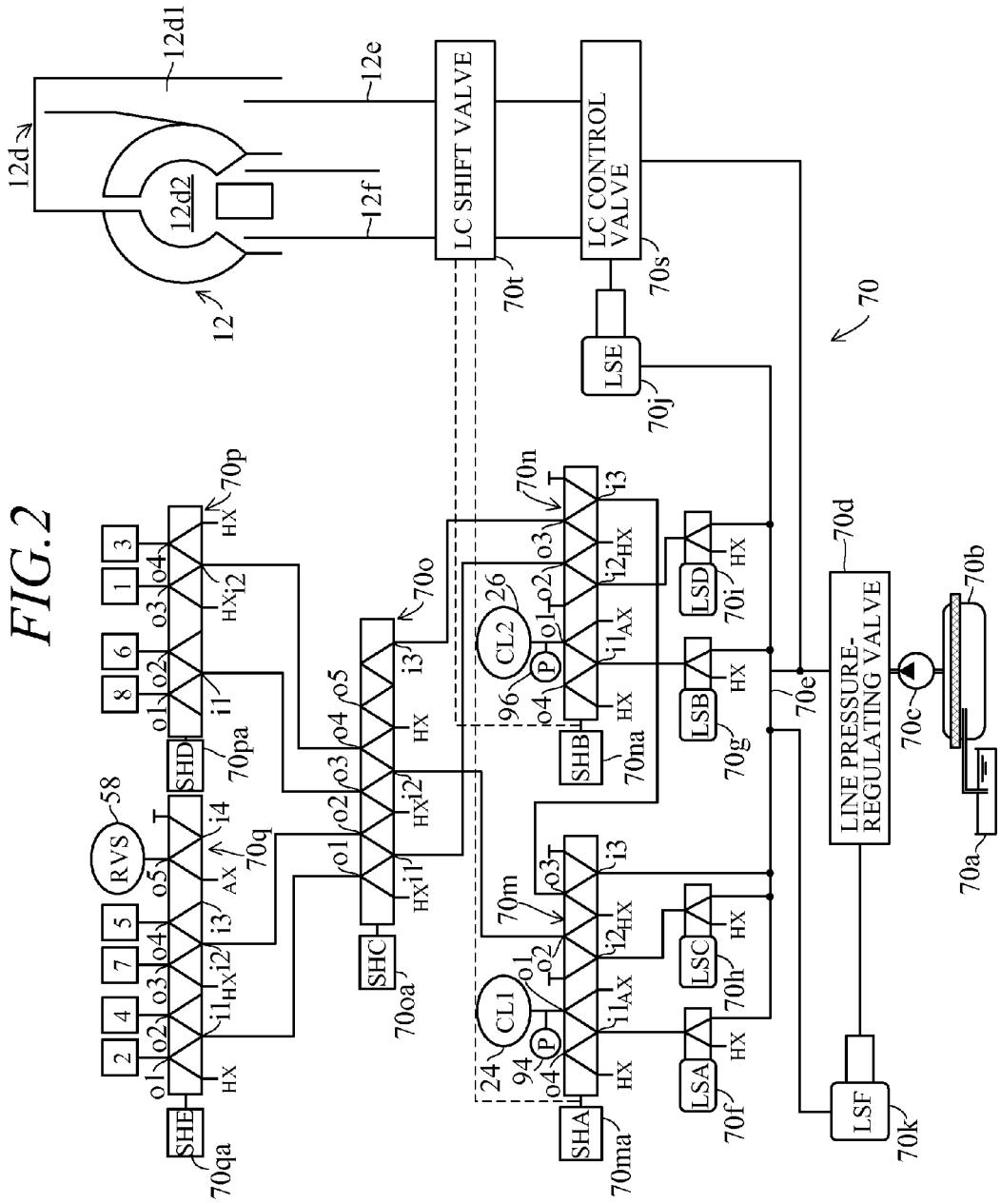
FIG. 2 is a circuit diagram illustrating the structure of a hydraulic pressure supply circuit shown in FIG. 1.
Figure 3:
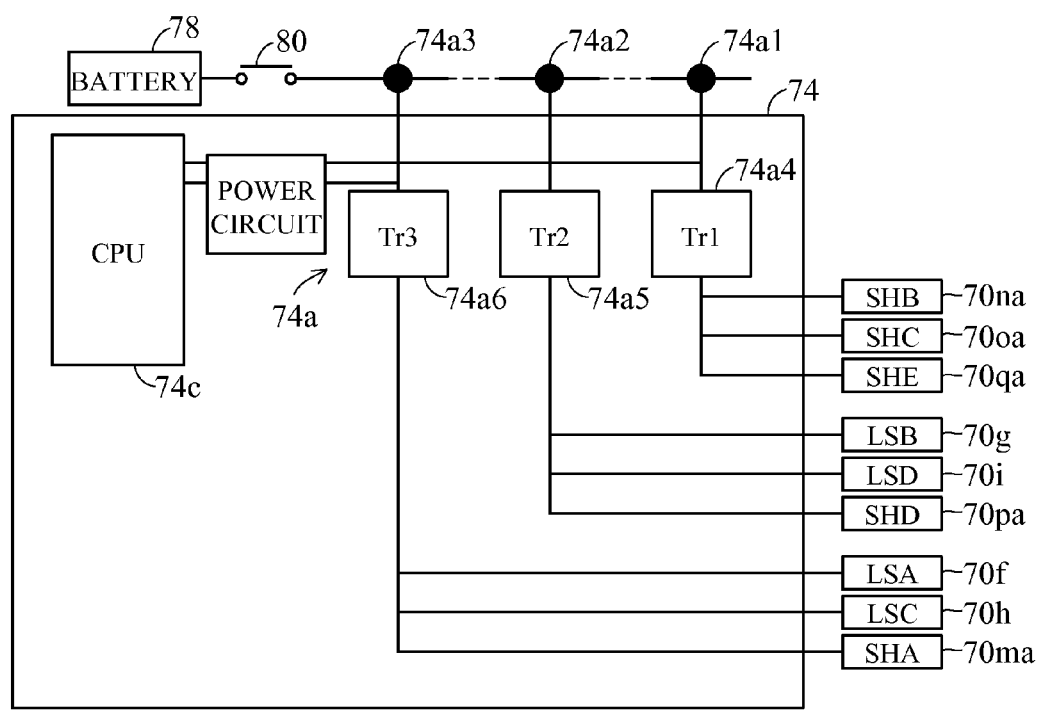
FIG. 3 is a block diagram showing the configuration of a shift controller shown in FIG. 1, with focus on a power source system.

FIG. 2 is a circuit diagram illustrating the structure of the hydraulic pressure supply circuit 70 in detail, FIG. 3 is a block diagram showing the configuration of a shift controller 74 of FIG. 1, with focus on an electric power source system, and FIG. 4 is an explanatory diagram showing an operating mode of the hydraulic pressure supply circuit 70 of FIG. 2.

Explanation will first be made with reference to FIG. 2. In the hydraulic pressure supply circuit 70, the discharge pressure (hydraulic pressure) of hydraulic oil ATF pumped from a reservoir (oil pan formed at the bottom of a transmission case) 70a through a strainer 70b by an oil pump (oil feed pump) 70c is pressure-regulated (depressurized) to line pressure by a line pressure-regulating valve (regulator valve) 70d.

Although not illustrated in the drawings, the oil pump 70c is connected to the pump impeller 12b of the torque converter 12 through a gear so as to be driven for operation by the engine 10.

The line pressure regulated by the line pressure-regulating valve 70d is sent through an oil passage (hydraulic passage) 70e to input ports of first to sixth linear solenoid valves (pressure-regulating valves), namely, a valve (LSA) 70f, a valve (LSB) 70g, a valve (LSC) 70h, a valve (LSD) 70i, a valve (LSE) 70j, and a valve (LSF) 70k.

The first to fifth linear solenoid valves 70f to 70j are pressure-regulating valves (electromagnetic pressure-regulating valves) configured as N/C (Normal/Closed) type to have a linear characteristic curve, so that when current flows through the solenoid, a spool is moved in proportion to the current flow to vary the hydraulic pressure inputted from the input port and outputted from its output port (output pressure) linearly, and so that the spool moves to an open position upon passage of current.

The characteristic of the sixth linear solenoid valve (LSF) 70k is defined as N/O (Normal/Open) that is differently from that of the first to fifth linear solenoid valves, namely, so that hydraulic pressure is maximum at de-energization and falls upon application current, whereafter the output hydraulic pressure decreases with increasing energization current.

Hydraulic pressure sent to the first linear solenoid valve (LSA) 70f is pressure-regulated to clutch pressure (pressure supplied to the first clutch for odd-numbered speeds (CL1) 24) and outputted from the output port thereof, while hydraulic pressure sent to the second linear solenoid valve (LSB) 70g is pressure-regulated to clutch pressure (pressure supplied to the second clutch for even-numbered speeds (CL2) 26) and outputted from the output port thereof.

Hydraulic pressure sent to the third linear solenoid valve (LSC) 70h is pressure-regulated to gear engagement pressure (pressure supplied to gear engaging mechanisms 60) and outputted from the output port thereof, while hydraulic pressure sent to the fourth linear solenoid valve (LSD) 70i is pressure-regulated to gear engagement pressure and outputted from the output port thereof.

Hydraulic pressure sent to the fifth linear solenoid valve (LSE) 70j is pressure-regulated to control (supply) pressure of the torque converter 12 and outputted from the output port thereof, while hydraulic pressure sent to the sixth linear solenoid valve (LSF) 70k is applied to the spool of the line pressure-regulating valve 70d as a signal pressure, whereby the line pressure output from the output port of the line pressure-regulating valve 70d is pressure-regulated to a line command pressure.

An odd-numbered speed clutch shift valve (select valve) 70m is installed downstream of the first and third linear solenoid valves (LSA) 70f and (LSC) 70h. The odd-numbered speed clutch shift valve 70m is provided with input ports i1, i2, i3 and output ports o1, o2, o3, o4. The input port i1 is connected to the output port of the first linear solenoid valve 70f, the input port i2 is connected to the output port of the third linear solenoid valve 70h, and the input port i3 is connected to the oil passage 70e.

An even-numbered speed clutch shift valve (select valve) 70n is installed downstream of the second and fourth linear solenoid valves (LSB) 70g and (LSD) 70i. The even-numbered speed clutch shift valve 70n is provided with input ports i1, i2, i3 and output ports o1, o2, o3, o4. The input port i1 is connected to the output port of the second linear solenoid valve 70g, the input port i2 is connected to the output port of the fourth linear solenoid valve 70i, and the input port i3 is connected to the output port o3 of the odd-numbered speed clutch shift valve 70m.

Three servo shift valves (select valves), specifically, a first servo shift valve 70o, a second servo shift valve 70p and a third servo shift valve 70q are installed downstream of the odd-numbered speed clutch shift valve 70m and even-numbered speed clutch shift valve 70n in hydraulic pressure supply.

The first servo shift valve 70o is provided with input ports i1, i2, i3 and output ports o1, o2, o3, o4, o5.

The second servo shift valve 70p is provided with input ports i1, i2 and output ports o1, o2, o3, o4, and the third servo shift valve 70q is provided with input ports i1, i2, i3, i4 and output ports o1, o2, o3, o4, o5.

In the odd-numbered speed clutch shift valve 70m, the output port o1 is connected to the first clutch 24 and the output port o2 to the input port i2 of the first servo shift valve 70o, and, as stated earlier, the output port o3 is connected to the input port i3 of the even-numbered speed clutch shift valve 70n.

In the even-numbered speed clutch shift valve 70n, the output port o1 is connected to the second clutch 26, the output port o2 to the input port i1 of the first servo shift valve 70o, and the output port o3 to the input port i3 of the first servo shift valve 70o.

In the first servo shift valve 70o, the output port o1 is connected to the input port i1 of the third servo shift valve 70q, the output port o2 to the input port i2 of the third servo shift valve 70q, the output port o3 to the input port i1 of the second servo shift valve 70p, and the output port o4 to the input port i2 of the second servo shift valve 70p.

In FIG. 2, the numerals 1 to 8 above the second and third servo shift valves 70p and 70q indicate piston chambers of the 8 speed gears of the gear engaging mechanisms 60. In the second servo shift valve 70p, the output port o1 is connected to the eighth-speed piston chamber of the sixth-eighth speed gear engaging mechanism 60(6-8), the output port o2 to the sixth-speed piston chamber thereof, the output port o3 to the first-speed piston chamber of the first-third speed gear engaging mechanism 60(1-3), and the output port o4 to the third-speed piston chamber thereof.

In the third servo shift valve 70q, the output port o1 is connected to the second-speed piston chamber of the second-fourth speed gear engaging mechanism 60(2-4), the output port o2 to the fourth-speed piston chamber thereof, the output port o3 to the seventh-speed piston chamber of the fifth-seventh speed gear engaging mechanism 60(5-7), and the output port o4 to the fifth-speed piston chamber thereof, and the output port o5 is connected to the RVS clutch 58.

The odd-numbered and even-numbered speed clutch shift valves 70m and 70n, and the first to third servo shift valves 70o, 70p and 70q are individually provided with shift valves. Namely, the odd-numbered speed clutch shift valve 70m is provided with a shift valve (SHA) 70ma and the even-numbered speed clutch shift valve 70n is provided with a shift valve (SHB) 70na, while the first to third servo shift valves 70o, 70p and 70q are provided with shift valves (SHC) 70oa, (SHD) 70pa and (SHE) 70qa, respectively.

The five shift valves (SHA) 70ma, (SHB) 70na, (SHC) 70oa, (SHD) 70pa and (SHE) 70qa are all on-off solenoid valves (hydraulic control valve (electromagnetic control valves)) configured to output a signal pressure when a plunger moves from off-position to on-position in response to passage of current through (energization of) the solenoid, thereby changing the position of the associated valve spool.

More concretely, in the odd-numbered and even-numbered speed clutch shift valves 70m and 70n, when the solenoids of the shift valves (SHA) 70ma and (SHB) 70na are energized, the input ports connect with the output ports on the left side of the drawing in response to movement of the spools by the signal pressures, while when they are de-energized, the input ports connect with different output ports on the right side. Owing to this configuration, the hydraulic pressure regulated by the first linear solenoid valve (LSA) 70f or the second linear solenoid valve (LSB) 70g is supplied to the first clutch 24 or the second clutch 26, and the hydraulic pressure regulated by the third linear solenoid valve (LSC) 70h or the fourth linear solenoid valve (LSD) 70i is supplied to the servo shift valve 70o.

Further, the configuration is such that, in the first to third servo shift valves 70o, 70p and 70q, when the solenoids of the associated shift valves (SHC) 70oa, (SHD) 70pa and (SHE) 70qa are energized, the input ports connect with predetermined output ports, specifically with output ports on the left side, while when they are de-energized, the input ports connect with output ports on a different side from the aforesaid predetermined ones, specifically with output ports on the right side.

When the solenoids of the shift valves (SHA) 70ma, (SHB) 70na are energized, the input ports are connected through a backup oil passage to one of the first to third servo shift valves 70o, 70p, 70q to supply hydraulic pressure regulated by the first linear solenoid valve (LSA) 70f or the second linear solenoid valve (LSB) 70g to the gear engaging mechanisms 60.

To explain in this regard, in the odd-numbered speed clutch shift valve 70m, when the solenoid of the shift valve (SHA) 70ma is energized, the output port o4 is connected to the input port i3 of the third servo shift valve 70q, and when the solenoid of its shift valve 70qa is energized, the input port i3 is connected to the output port o4, by which configuration the clutch hydraulic pressure regulated by the first linear solenoid valve (LSA) 70f is supplied in backup fashion to the fifth-speed piston chamber of the fifth-seventh speed gear engaging mechanism 60(5-7) to establish the fifth speed.

Similarly, in the even-numbered speed clutch shift valve 70n, when the solenoid of the shift valve (SHB) 70na is energized, the output port o4 is connected to the input port i3 of the first servo shift valve 70o, and when the solenoid of its shift valve (SHC) 70oa is energized, the input port i3 is connected to the output port o5. The output port o5 of the first servo shift valve 70o is connected to the input port it of the second servo shift valve 70p.

When the solenoid of the shift valve (SHD) 70pa of the second servo shift valve 70p is energized, the input port it is connected from the output port o1 to the eighth-speed piston chamber. On the other hand, when the solenoid of the shift valve (SHD) 70pa of the second servo shift valve 70p is de-energized, the input port it is connected from the output port o2 to the sixth-speed piston chamber, by which configuration the clutch hydraulic pressure regulated by the second linear solenoid valve (LSB) 70g is supplied in backup fashion to the sixth-speed and eighth-speed piston chamber of the sixth-eighth speed gear engaging mechanism 60(6-8) to establish the sixth speed and eighth speed. At this time, the shift valve 70 (SHE) qa of the third servo shift valve 70q is de-energized.

Further, regarding the control of the lock-up clutch (LC) 12d of the torque converter 12, an LC control valve 70s sends the line pressure of the oil passage 70e (more exactly, hydraulic pressure obtained by depressurizing the line pressure) to an LC shift valve 70t in accordance with control pressure regulated by the fifth linear solenoid valve (LSE) 70j.

The outputs (hydraulic pressures) of the shift valves (SHA) 70ma, (SHB) 70na disposed in the odd-numbered and even-numbered speed clutch shift valves 70m, 70n are applied to the spool of the LC shift valve 70t as signal pressure to control the supply and discharge of hydraulic pressure to the lock-up clutch (LC) 12d of the torque converter 12, by which configuration the lock-up clutch 12d is on-off controlled.

More specifically, when either or both of the shift valves (SHA) 70ma, (SHB) 70na are energized, the LC shift valve 70t is controlled to the LC-off position and line pressure is supplied from the LC control valve 70s through an oil passage 12e to a backpressure chamber 12d1 of the lock-up clutch 12d, thereby controlling the lock-up clutch 12d to the off (disengaged) position.

On the other hand, when the shift valves (SHA) 70ma, (SHB) 70na are both de-energized, the LC shift valve 70t is controlled to the LC-on position and line pressure is supplied from the LC control valve 70s through an oil passage 12f to an internal pressure chamber 12d2 of the lock-up clutch 12d, thereby turning on (engaging) the lock-up clutch 12d. At this time, the amount of engagement of the lock-up clutch 12d is regulated by the LC-off position of the LC shift valve 70t dictated by the control pressure.

Returning to the explanation of FIG. 1, the transmission T is equipped with a shift controller 74. The shift controller 74 comprises an electronic control unit (ECU) equipped with a CPU, ROM, RAM and the like. Further, an engine controller 76, similarly comprising an electronic control unit equipped with a microcomputer, is installed for controlling operation of the engine 10.

The shift controller 74 is configured to communicate with the engine controller 76 and acquires various information from the engine controller 76, including engine speed NE, throttle opening TH, and accelerator position AP.

FIG. 3 shows a current supply circuit 74a for supplying current to the solenoids of the four (first to fourth) linear solenoid valves (LSA) 70f, (LSB) 70g, (LSC) 70h and (LSD)

70i, and the solenoids of the five (first to fifth) shift valves (SHA) 70ma, (SHB) 70na, (SHC) 70oa, (SHD) 70pa and (SHE) 70qa. The current supply circuit 74a is disposed in the shift controller 74. The fifth and sixth linear solenoid valves (LSE) 70j, (LSF) 70k are not shown in FIG. 3.

As illustrated, the current supply circuit 74a comprises three terminals 74a1, 74a2 and 74a3, and cut-off transistors 74a4, 74a5 and 74a6, for connecting the solenoids of the first to fourth linear solenoid valves to a battery (power source) 78. In the drawing, CPU 74c denotes a current control CPU, which is configured to energize/de-energize the solenoids when supplied and not supplied with current to the bases of the cut-off transistors.

As illustrated, a conventional ignition switch (IG) 80 is interposed between the battery 78 and the three terminals 74a1, 74a2, 74a3, by which configuration the engine 10 can be started and stopped in response to an operation of a driver.

Returning to the explanation of FIG. 1, in the case of the illustrated double-clutch transmission T, when the D range is selected by the driver, hydraulic pressure is supplied to the one of the gear engaging mechanisms 60 associated with the next speed gear to once pre-engage (mesh; preshift) one of the first and second auxiliary input shaft 20, 22, and then while hydraulic pressure is discharging from the one of the first and second clutches 24, 26 on the side associated with the current speed gear, hydraulic pressure is supplied to the other of the first and second clutches 24, 26 on the side associated with the one of the first auxiliary input shafts 20, 22 corresponding to the auxiliary input shaft associated with the next speed gear to shift speeds by engaging (meshing) with the even-numbered speed input shaft 14 or the odd-numbered speed input shaft 16.

Gear-shifting is fundamentally performed alternately between odd-numbered (1, 3, 5, 7) speed gears and even-numbered (2, 4, 6, 8) speed gears. As explained above, the piston rods of the gear engaging mechanisms 60 are connected through shift forks to fork shafts, detent mechanisms having concavo-convex surfaces are machined into the fork shafts, and when driven to one of the associated speed gears or the neutral position therebetween, the shift fork engages with an indentation in the detent mechanism so as to be retained in the driven position even if supply of hydraulic pressure is stopped.

When the driver selects the P or N range, supply of current to the linear solenoid valves (LSA) 70f, (LSB) 70g is stopped (turned off) and supply of current to the shift valves (SHA) 70ma, (SHB) 70na is started (turned on), thereby establishing the P or N range.

When the driver selects the R range, supply of current to the linear solenoid valve (LSA) 70f is stopped (turned off), supply of current to the (LSB) 70g is started (turned on), supply of current to the shift valve (SHA) 70ma is stopped, and supply of current to the shift valves (SHB) 70na and (SHE) 70qa is started, thereby connecting the output port o4 of the even-numbered speed clutch shift valve 70n through an unshown oil passage to the input port i4 and output port o5 of the third servo shift valve 70q, thus supplying hydraulic pressure via that route to engage the RVS clutch 58 and establish the R range.

FIG. 4 is an explanatory diagram showing operating modes of the hydraulic pressure supply circuit 70 shown in FIG. 2.

In FIG. 4, the symbols of the linear solenoid valves (LSA) 70f, (LSB) 70g, (LSC) 70h and (LSD) 70i are abbreviated to A, B, C and D, respectively. Energization and de-energization of the shift valves (SHA) 70ma to (SHE) 70qa are indicated by symbols o and x, respectively. The symbols A, B, C and D of the "clutches" and "gear engaging mechanism" PSn (PS: piston chamber; n: speed gear) indicate that hydraulic pressure regulated by linear solenoid valve (LSA) 70f, (LSA) 70g, (LSC) 70h, (LSD) 70i and so on is supplied, and x indicates that hydraulic pressure is not supplied.

Three operating modes A, B, C are established for the case where the linear solenoid valve (LSD) 70i and (LSC) 70h are in ordinary (normal) condition and the cases where they are in failed condition. Mode A is implemented when both are in ordinary (normal) condition, mode B when the (LSD) 70i is in failed condition, and mode C when the (LSC) 70h is in failed condition.

As illustrated, in mode B, since the linear solenoid valve (LSD) 70i has failed, its output hydraulic pressure is shut off by energizing the shift valve (SHB) 70na, and during this operation, the output hydraulic pressure of the linear solenoid valve (LSB) 70g for regulating clutch hydraulic pressure is also used in modes B5 and B7. In mode C, since the linear solenoid valve (LSC) 70h has failed, its output hydraulic pressure is shut off by energizing the shift valve (SHA) 70ma, and during this operation, the output hydraulic pressure of the linear solenoid valve (LSA) 70f for regulating clutch hydraulic pressure is also used in modes C2, C4, C6 and C8.

Engagement/disengagement and the like of the lock-up clutch 12d of the torque converter 12 is not indicated in FIG. 4.

Returning to the explanation of FIG. 1, first, second, third and fourth rotational speed sensors (operating state detector) 82, 84, 86 and 90 disposed near the idler shaft 18, first auxiliary input shaft 20, second auxiliary input shaft 22 and output shaft 28 of the transmission T respectively output a signal indicating input rotational speed NM to the transmission T from the idler shaft 18, signals indicating rotational speeds of the first and second auxiliary input shafts 20, 22, and a signal indicating rotational speed of the output shaft 28 (output rotational speed of the transmission T) NC (namely, vehicle speed V).

In the hydraulic pressure supply circuit 70 (FIG. 2), hydraulic pressure sensors 94 and 96 disposed on an oil passage connecting the output port o1 of the odd-numbered speed clutch shift valve 70m and the first clutch 24 and an oil passage connecting the output port o1 of the even-numbered speed clutch shift valve 70n and the second clutch 26 output signals indicating the pressures (hydraulic pressures) of hydraulic oil ATF supplied to the first and second clutches 24 and 26.

A range selector position sensor 100 disposed near a range selector (not shown) installed at a driver's seat of the vehicle 1 outputs a signal indicating a range to which the driver has operated the range selector (selected range) among, for example, ranges indicated on the range selector in the order of P, R, N and D from the top down as viewed by the driver.

A stroke sensor 102 installed near the sleeve of each gear engaging mechanisms 60 outputs a signal in accordance with the operating state of the piston rod that establishes the speed gear by displacement between the neutral and in-gear (engaged) positions of the sleeve.

The outputs of these sensors are all sent to the shift controller 74. Based on these sensor outputs, plus other data obtained through communication with the engine controller 76, the shift controller 74 energizes/de-energizes the linear solenoid valve (LSA) 70f and so on so as to control the operation of the first and second clutches 24, 26 and so on, and also the gear engaging mechanisms 60, and thereby control the operation of the transmission T.

The operation of the apparatus according to this embodiment, specifically the shift controller 74, will be explained next.

Figure 7:
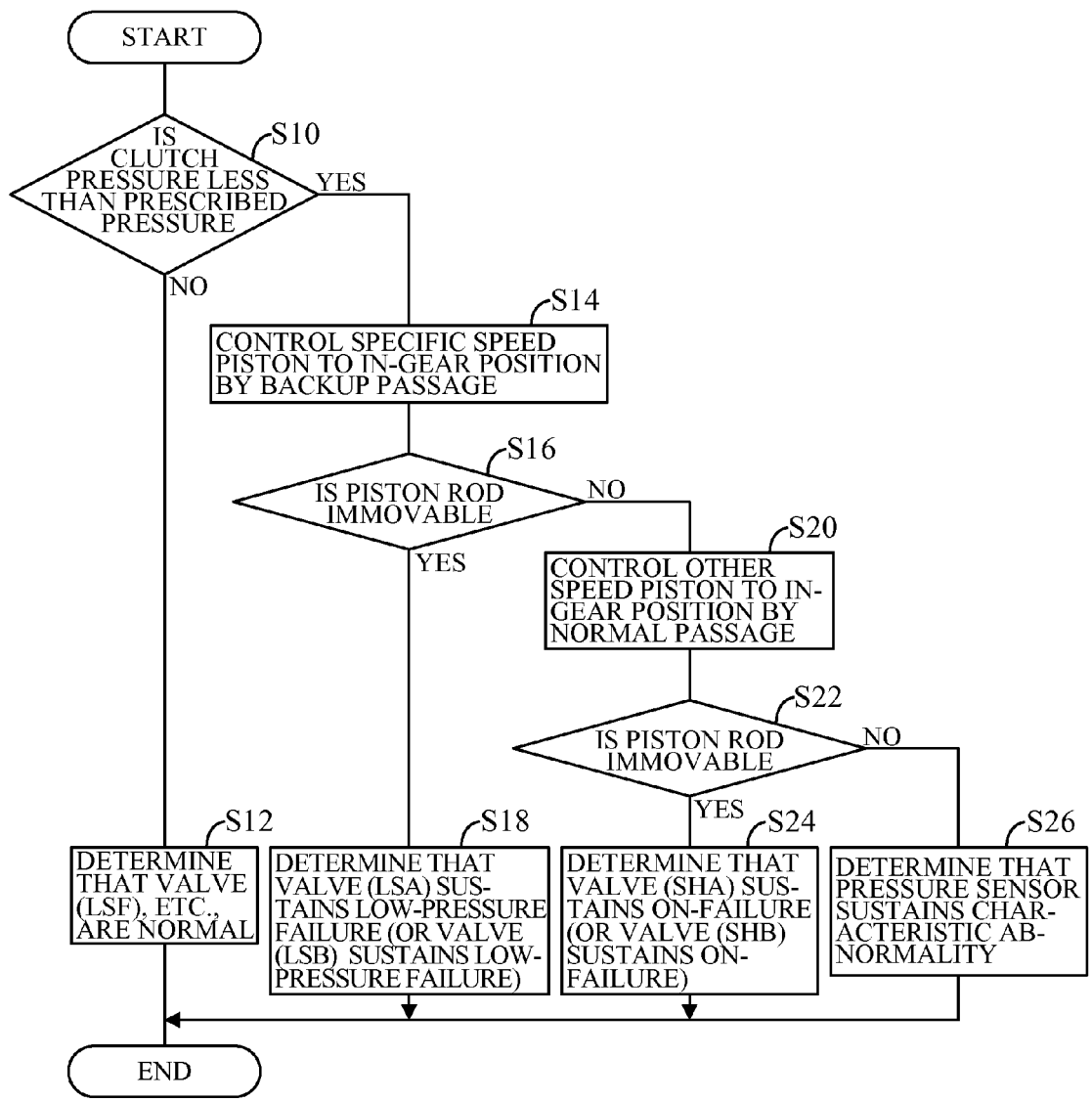
FIG. 7 is a flowchart showing processing represented by the sequence diagram of FIG. 5.
Figure 8:
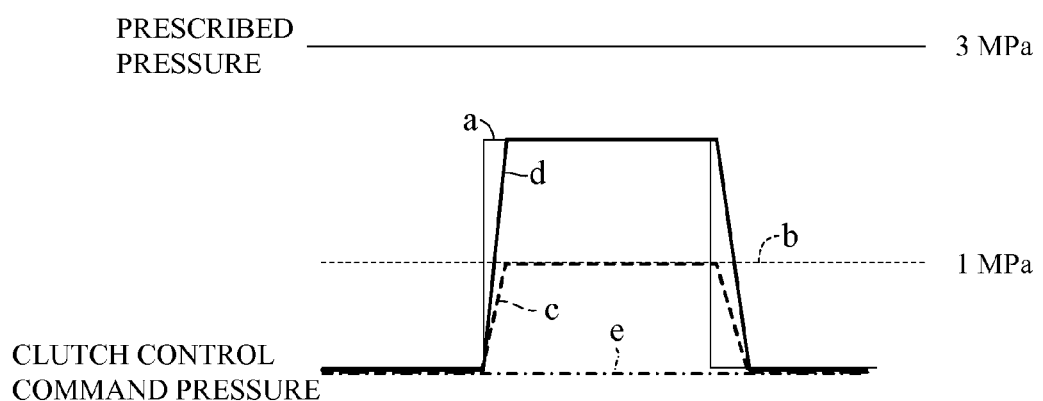
FIG. 8 is an explanatory diagram of the line command pressure and the like used in the processing of the flowchart of FIG. 7.
Figure 9:
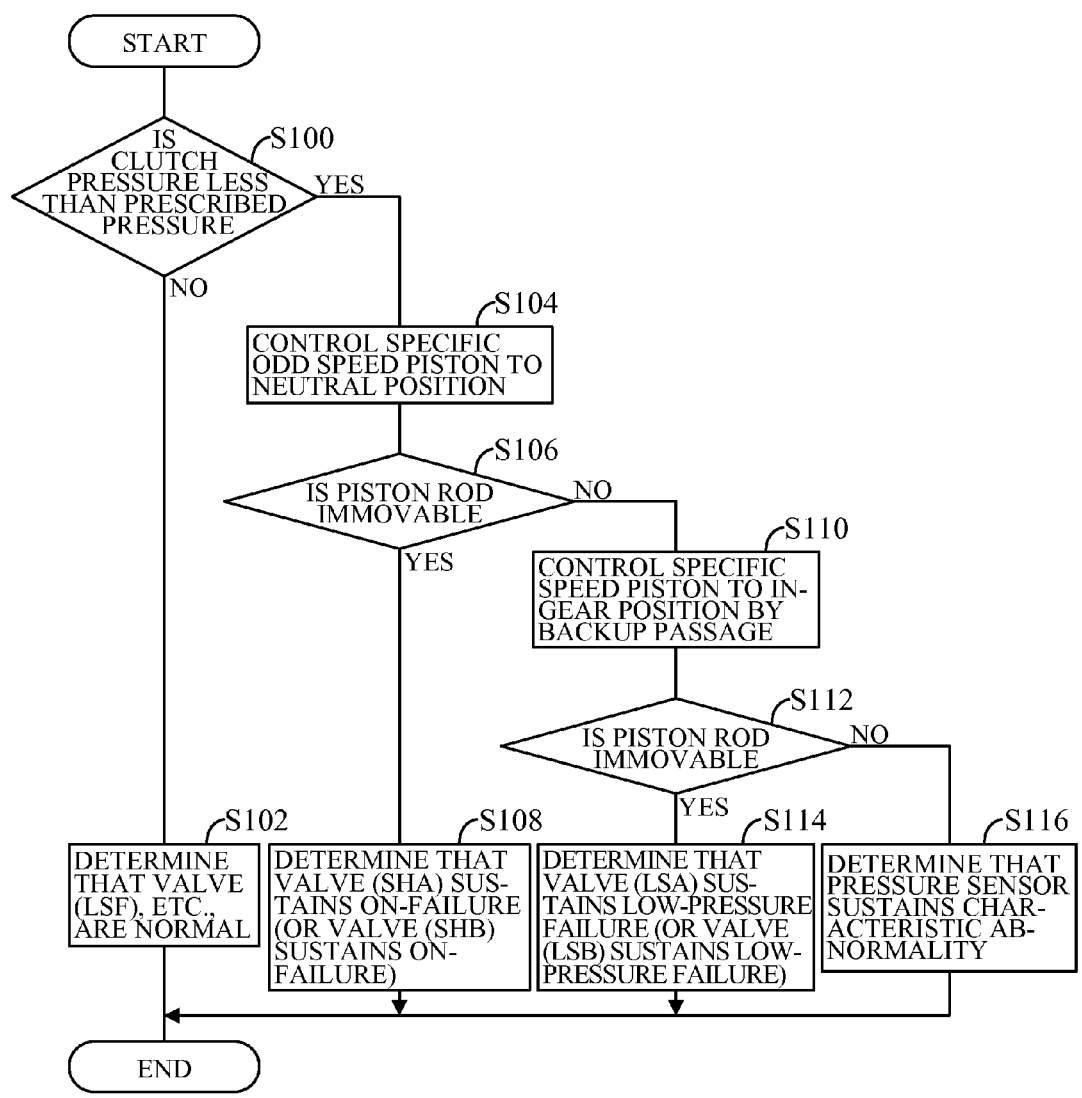
FIG. 9 is also a flowchart showing processing represented by the sequence diagram of FIG. 5.

FIG. 5 is a sequence diagram showing the operation of the apparatus shown in FIG. 1, more specifically the shift controller 74 with respect to the odd-numbered speed side; FIG. 6 is a similar sequence diagram with respect to the even-numbered speeds; FIG. 7 is a flowchart showing processing represented by the sequence diagram of FIG. 5; FIG. 8 is an explanatory diagram of the line command pressure and the like used in the processing of the flowchart of FIG. 7; and FIG. 9 is also a flowchart showing processing represented by the sequence diagram of FIG. 5.

Now to explain first with reference to FIG. 7, the program begins at S10, in which it is determined whether the clutch pressure detected by the hydraulic pressure sensors 94, 96 is less (lower) than a prescribed pressure.

This is in light of the fact that when the shift controller 74 controls operation of the transmission T, it controls current supply to the linear solenoid valve (LSF) 70$k$ to raise the output hydraulic pressure of the line pressure-regulating valve 70$d$ to about 3.0 MPa, as shown in FIG. 8, and controls current supply to the linear solenoid valves (LSA) 70$f$ and (LSB) 70$g$ to raise the output hydraulic pressure to the clutches 24 and 26 (clutch control command pressure (indicated by symbol a)) to higher than 1.0 MPa (line pressure lower limit value; prescribed pressure (indicated by symbol b)), and the actual output hydraulic pressure at this time is detected by the hydraulic pressure sensors 94, 96.

As stated earlier, the characteristic of the linear solenoid valve (LSF) 70$k$ is defined differently from that of the other linear solenoid valves, namely, so that output hydraulic pressure is maximum at de-energization and falls upon application of current, whereafter the output hydraulic pressure decreases with increasing energization current.

When the detected clutch hydraulic pressure is at or higher than symbol b or c in FIG. 8, this means the clutch hydraulic pressure is normal, so the result in S10 of the flowchart of FIG. 7 is NO and the program proceeds to S12, in which it is determined that the linear solenoid valve (LSF) 70$k$ and the like are normal.

On the other hand, when the detected clutch hydraulic pressure is below symbol c in FIG. 8, at symbol e, for example, the determination of S10 is YES and the program proceeds to S14, in which in-gear control directed to one of the gear engaging mechanisms 60 that establishes a specific speed is executed using the aforesaid backup oil passage. The processing form S14 onward corresponds to the aforesaid failure determination.

More specifically, when a failure arises that causes low clutch hydraulic pressure, conceivable failure sites are as follows.

In the case of the odd-numbered speed clutch 24 . . . low-pressure fail (malfunction) of the linear solenoid valve (LSA) 70$f$, ON-failure of the shift valve (SHA) 70$ma$, and characteristic abnormality (failure) of the hydraulic pressure sensor 94.

In the case of the even-numbered speed clutch 26 . . . low-pressure fail (malfunction) of the linear solenoid valve (LSB) 70$g$, ON-failure of the shift valve (SHB) 70$na$, and characteristic abnormality (failure) of the hydraulic pressure sensor 96.

"ON-failure" in the foregoing means sticking failure in the energized (operating) state. In FIGS. 5 and 6, the shift valve (SHA) or (SHB) is denoted (1), and the linear solenoid valve (LSA) or (LSB) is denoted (2).

Since the range of conceivable failure sites is thus diverse, the impossibility of identifying the source of a failure has often made it difficult to promptly implement remedial action. The object of this embodiment is therefore to promptly and efficiently identify failure sites by failure determination.

As set out earlier, in another aspect this embodiment is configured to enable use of the backup oil passage (first oil passage) to supply hydraulic pressure to the fifth-speed piston chamber, for an odd-numbered speed, or the sixth- or eighth-speed chamber, for an even-numbered speed, thereby to operate the gear engaging mechanisms 60 with hydraulic pressure controlled by the linear solenoid valve (LSA) 70$g$ or (LSB) 70$i$ for the clutch 24 or 26, and so advantage was taken of this opportune configuration in performing failure determination to identify failure sites in the case of failures that cause low clutch pressure.

The case of operating one of the gear engaging mechanisms 60 using the backup oil passage will be explained with reference to the circuit diagram of FIG. 4.

It becomes either modes B5, B7 capable of establishing the sixth speed or eighth speed by use of the linear solenoid valve (LSB) 70$g$ or modes C2, C4, C6, C8 capable of establishing the fifth speed by use of the linear solenoid valve (LSA) 70$f$.

As clear from FIG. 4 and FIG. 2, in modes B5, B7 capable of establishing the sixth speed or eighth speed, the shift valves (SHB) 70$na$ and (SHC) 70$oa$ must be turned ON (energized). The shift valve (SHD) 70$pa$ must be turned ON to establish the sixth speed and must be turned OFF to establish the eighth speed.

In modes C2, C4, C6, C8 capable of establishing the fifth speed, the shift valves (SHA) 70$ma$ and (SHE) 70$qa$ must be turned ON.

As shown in the sequence diagram of FIG. 5, in the basic processing for detecting clutch low-pressure malfunction in the case of odd-numbered speeds, all clutches (clutches 24, 26) are disengaged (SEQ1), the piston rods of the first-third speed gear engaging mechanism (1-3) and sixth-eighth speed gear engaging mechanism (6-8) on the side of the odd-numbered speed clutch shift valve 70$m$ are neutral-controlled (controlled to the neutral position (N)) (SEQ2), the fifth-seventh gear engaging mechanism 60(5-7) are in-gear-controlled by output pressure of the linear solenoid valve (LSA) 70$f$ for the second clutch 26 supplied from the backup oil passage (SEQ3), next neutral-controlled (SEQ4), and next in-gear controlled by normal mode (mode A of FIG. 4; in the case of the aforesaid second oil passage) in a different speed therefrom (first speed) (SEQ5).

The failure site can therefore be determined by detecting in the sequence (SEQ3) whether the clutch source pressure is being outputted at the prescribed value and in the sequence (SEQ4 or SEQ2) whether the shift valve (SHA) 70$ma$ is made OFF (de-energized).

Returning to the explanation of the flowchart of FIG. 7 against the backdrop of the foregoing, in S14 a specific speed piston is in-gear controlled by the backup oil passage. In the sequence diagram of FIG. 6, this corresponds to the processing for supplying the output pressure of the linear solenoid valve (LSA) 70$f$ for the first clutch 24 from the backup oil passage to in-gear control the fifth-seventh speed gear engaging mechanism 60(5-7) (SEQ3).

The program next proceeds to S16, in which it is determined whether the piston rod of the fifth-seventh speed gear engaging mechanism 60(5-7) is immovable (has not moved), and when the result is YES, the program proceeds to S18, in which it is determined that the linear solenoid valve (LSA) 70$f$ for the first clutch 24 sustains low-pressure failure.

On the other hand, when the result in S16 is NO, the program proceeds to S20, in which a different speed piston therefrom is in-gear controlled using the normal oil passage (mode A of FIG. 4; aforesaid second oil passage). Specifically, the piston rod of the first-third speed gear engaging mechanism 60(1-3) is preshifted to the third-speed piston chamber (in-gear controlled).

The program next proceeds to S22, in which the operating condition of the piston rod at this time is determined from the output of the stroke sensor 102. Specifically, it is determined whether the piston rod is immovable (has not moved).

When the result in S22 is YES, the program proceeds to S24, in which it is determined that the shift valve (SHA) 70*ma* of the odd-numbered speed clutch shift valve 70*m* sustains ON-failure, and when the result is NO, determines that the shift valve (SHA) 70*ma* is normal and proceeds to S26, in which it is determined that the hydraulic pressure sensor 94 of the first clutch 24 sustains characteristic abnormality (failure).

In other words, since the result in S16 being YES means that the piston rod of the fifth-seventh speed gear engaging mechanism 60(5-7) is inoperative, it can be determined that the first linear solenoid valve (LSA) 70*f* for the first clutch 24 sustains low-pressure failure, namely, insufficient output hydraulic pressure.

On the other hand, when the result in S16 is NO, the cause could be either ON-failure of the shift valve (SHA) 70*ma* of the odd-numbered speed clutch shift valve 70*m* or characteristic abnormality (failure) of the hydraulic pressure sensor 94, but which is not clear at this time point.

Specifically, as explained with reference to FIG. 2, establishment of the fifth-speed of the fifth-seventh speed gear engaging mechanism 60(5-7) through the backup oil passage requires that the shift valves (SHA) 70*ma* and (SHE) 70*qa* both be turned ON (energized), but the fact that the piston rod operated makes it impossible to determine at this time point that the shift valve (SHA) 70*ma* failed.

Accordingly, in S20, the shift valve (SHA) 70*ma* is turned OFF (de-energized) and control is intentionally performed in a condition that establishes a speed stage, specifically, as shown in FIG. 2, hydraulic pressure is supplied in normal mode (mode A of FIG. 4) to the third-speed piston chamber at the first-third gear engaging mechanism 60(1-3) to establish the third speed (or vice versa).

As is clear from FIG. 2, the shift valves (SHA) 70*ma*, (SHC) 70*oa* and SHD (70*pa*) must all be turned OFF (de-energized) in this case. For example, in the odd-numbered speed clutch shift valve 70*m*, the shift valve (SHA) 70*ma* is turned OFF to connect the input port i2 to the output port o2, and in the servo shift valve 70*p*, the shift valve (SHD) 70*pa* is turned OFF to connect the input port i2 to the output port o4.

Therefore, whether the shift valve (SHA) 70*ma* sustains ON-failure can be determined by turning the shift valve (SHA) 70*ma* ON/OFF and determining whether the speed stage is properly established (i.e., whether the piston rod moved) from the output of the stroke sensor 102.

Specifically, when the result of the determination in S22 of the flowchart of FIG. 7 is YES, the program proceeds to S24, in which it can be determined that the shift valve (SHA) 70*ma* sustains ON-failure.

When, to the contrary, the result in S22 is NO, it can be determined that neither the first linear solenoid valve (LSA) 70*f* for the first clutch 24 nor the shift valve (SHA) 70*ma* has failed, and since this means that the determination of S10 was itself incorrect, it can be determined that the hydraulic pressure sensor 94 sustains characteristic abnormality (failure).

Next, the processing of the sequence diagram of FIG. 5 will explained with reference to the flowchart of FIG. 9. The flowchart of FIG. 9 is processing focused on SEQ2 of the sequence diagram of FIG. 5 in the case where the first-third speed gear engaging mechanism 60(1-3) is in the in-gear condition.

Now to explain, the program begins at S100, in which the determination is made by the same manner as in the flowchart of FIG. 7, and when the result there is YES, the program proceeds to S104, in which the gear engaging mechanism 60 to which the output hydraulic pressure of the linear solenoid valve (LSC) 70*h* on the odd-numbered speed side is to be supplied, i.e., the first-third speed gear engaging mechanism 60(1-3), is neutral-controlled (preshifted to neutral position).

The program next proceeds to S106, in which it is determined from the output of the stroke sensor 102 whether the piston rod is immovable (has not moved), and when the result is YES, the program proceeds to S108, in which it is determined that the shift valve (SHA) 70*ma* of the odd-numbered speed clutch shift valve 70*m* sustains ON-failure, and when the result is NO, the shift valve (SHA) 70*ma* is determined to be normal (SEQ2 of the sequence diagram of FIG. 5).

Specifically, in order to move to neutral position by supplying hydraulic pressure to the third-speed piston chamber, it is necessary to turn all of the shift valves (SHA) 70*ma*, (SHC) 70*oa* and (SHD) 70*pa* OFF and supply the output hydraulic pressure of the linear solenoid valve (LSC) 70*h*. In order to oppositely shift to the neutral position by supplying to the first-speed piston chamber, it is necessary to turn the shift valves (SHA) 70*ma* and (SHC) 70*oa* OFF and turn (SHD) 70*pa* ON.

As a result, when the piston rod of the first-third speed gear engaging mechanism 60(1-3) operates (actuates), since it can be determined that the shift valve (SHA) 70*ma* (1) is normal, it can be determined that the linear solenoid valve (LSA) 70*f* (2) is normal.

On the other hand, when the piston rod of the first-third speed gear engaging mechanism 60(1-3) is immovable (does not operate), the shift valve (SHA) 70*ma* (1) sustains ON-failure, so that the output of the linear solenoid valve (LSA) 70*f* (2) is being drained.

When the result in S106 is NO, the program proceeds to S110 and onward to determine failure by using the backup oil passage to supply hydraulic pressure to the fifth-speed piston chamber and perform in-gear control to establish the fifth speed, but these steps are the same as S14 onward in the flowchart of FIG. 7 and explanation is omitted here.

Although the order of the determination in the processing of the flowchart of FIG. 9 is reversed from that of the processing of the flowchart of FIG. 7, failure of the shift valve (SHA) 70*ma* can be determined more quickly in proportion.

In the sequence diagram of FIG. 5, when no failure is determined by the processing up to SEQ3, the processing of SEQ4 and SEQ5 is repeated. Detailed explanation in this regard is omitted here.

Further, the foregoing also applies in the case where low pressure occurs on the side of even-numbered speed clutch 26 shown in the sequence diagram of FIG. 6, and whether the linear solenoid valve (LSB) 70*g* sustains low-pressure fail (malfunction), the shift valve (SHB) 70*na* sustains ON-failure, or the hydraulic pressure sensor 96 sustains characteristic abnormality is determined in accordance with the sequence shown in the drawing.

To explain with reference to the drawing, when low-pressure malfunction of the second clutch 26 is detected from the output of the hydraulic pressure sensor 96, all clutches (clutches 24, 26) are disengaged (SEQ1), the piston rods of the second-fourth speed gear engaging mechanisms (2-4) and fifth-seventh speed gear engaging mechanisms (5-7) on the side of the even-numbered speed clutch shift valve 70*n* are preshifted to the neutral position (N) (neutral-controlled) (SEQ2), the sixth-eighth gear engaging mechanisms 60(6-8) are supplied from the backup oil passage with output pressure of the second linear solenoid valve (LSB) 70g for the second clutch 26 to engage the eighth speed (in-gear control) (SEQ3), next preshifted to the neutral position (neutral-controlled) (SEQ4), and next engaged with the fourth speed different therefrom by normal mode (mode A of FIG. 4) (SEQ5).

As a result, since the shift valve (SHB) 70na is turned OFF (de-energized) when the fourth speed is established by the normal mode, it is possible by the processing of S22 of the flowchart of FIG. 7 to determine whether the shift valve (SHB) 70na sustained ON-failure or the hydraulic pressure sensor 96 sustained characteristic abnormality.

As stated above, the embodiment is configured to have an apparatus for determining failure of an automatic transmission (T), comprising: input shafts (14, 16, 20, 22) that input rotation of a prime mover (10) mounted on a vehicle (1) through a pair of clutches (24, 26); an output shaft (28) arranged in parallel to the input shafts; gear engaging mechanisms (60) that engage one of gears (32, . . . 54) to the input shafts and the output shaft to establish one of speeds corresponding to the engaged one of the gears; a first pressure-regulating valve (70d, 70k) that pressure-regulates hydraulic pressure discharged from an oil pump (70c) to line pressure; a second pressure-regulating valve (70f, 70g) that pressure-regulates the line pressure regulated by the first pressure-regulating valve (70d, 70k) to clutch engaging pressure for the clutches (24, 26); a third pressure-regulating valve (70h, 70i) that pressure-regulates the line pressure regulated by the first pressure-regulating valve (70d, 70k) to gear pressure for the gear engaging mechanisms (60); a first shift valve (70m, 70n) that has a solenoid valve (70ma, 70na) and outputs the clutch pressure regulated by the second pressure regulating valve (70f, 70g) and the gear pressure regulated by the third pressure regulating valve (70h, 70i) toward the clutches (24, 26) and the gear engaging mechanisms (60) when the solenoid valve (70ma, 70na) is de-energized, while outputting the clutch pressure regulated by the second pressure-regulating valve (70f, 70g) toward one of the gear engaging mechanisms (60) through a first oil passage when the solenoid valve (70ma, 70na) is energized; a second shift valve (70o, 70p, 70q) that is installed downstream of the first shift valve (70m, 70n) in hydraulic supply and selectively supplies the gear pressure outputted from the first shift valve (70m, 70n) to the gear engaging mechanisms (60) through a second oil passage that is different from the first oil passage; an operating state detector (102, 82, 84, 86) that detects operating state of the gear engaging mechanisms (60); and a pressure detector (94, 96) that detects the clutch pressure regulated by the second pressure-regulating valve (70f, 70g); characterized by: a failure determiner (74) that energizes the solenoid valve (70ma, 70na) to output the clutch pressure to the one of the gear engaging mechanisms (60) through the first oil passage when the clutch pressure detected by the pressure detector (94, 96) is less than a prescribed pressure, determines whether the one of the gear engaging mechanisms (60) operates based on output of the operating state detector (102, 82, 84, 86), determines that the second pressure-regulating valve (70f, 70g) has failed when the one of the gear engaging mechanisms (60) is determined to be inoperative (S10-S18), whereas determines that at least one of the solenoid valve (70ma, 70na) and the pressure detector (94, 96) has failed when the one of the gear engaging mechanisms (60) is determined to be operative (S20-S26).

With this, when a failure arises that causes the clutch pressure low, although the range of conceivable failure sites is diverse, it becomes possible to identify the source of the failure promptly and efficiently, whereby enabling to implement remedial action immediately.

In the apparatus, the failure determiner (74) that de-energizes the solenoid valve (70ma, 70na) to supply the gear pressure regulated by the third pressure-regulating valve (70h, 70i) to other of the gear engaging mechanisms (60) by the second shift valve (70o, 70p, 70q) through the second oil passage when the one of the gear engaging mechanisms (60) is determined to be operative, determines whether the other of the gear engaging mechanisms (60) operates based on the output of the operating state detector (102, 82, 84, 86), determines that the solenoid valve (70ma, 70na) has failed when the other of the gear engaging mechanisms (60) is determined to be inoperative, whereas determines that the pressure detector (94, 96) has failed when the other of the gear engaging mechanisms (60) is determined to be operative (S20-S26). With this, it becomes possible to determine the failure is solenoid valve 70ma or 70na or the pressure detector 94 or 96, whereby enabling to identify the source of the failure more promptly and efficiently.

In the apparatus, the failure determiner (74) controls, when any of the gear engaging mechanisms (60) is at in-gear position, the any of the gear engaging mechanisms (60) toward neutral position through the second shift valve (70o, 70p, 70q), determines whether the any of the gear engaging mechanisms (60) has moved to the neutral position based on the output of the operating state detector (102, 82, 84, 86), determines that the solenoid valve (70ma, 70na) has failed when the any of the gear engaging mechanisms (60) is determined to be immovable, whereas determines that the solenoid valve (70ma, 70na) is normal when the any of the gear engaging mechanisms (60) is determined to have moved (S100-S110). With this, it becomes possible to identify the source of the failure more promptly and efficiently. The reason is that when any piston is under the in-gear, the piston must first be returned to the neutral position. However, the failure can be determined at the neutral returning, the source can be identified more promptly and efficiently.

In the apparatus, the second pressure-regulating valve comprises two valves (70f, 70g); the third pressure-regulating valve comprises two valves (70h, 70i); the first shift valve comprises two valves (70m, 70n) each having the solenoid valve (70ma, 70na); and the failure determiner (74) energizes one of the two solenoid valves (70ma, 70na) to output the clutch pressure to the one of the gear engaging mechanisms (60) through the first oil passage when the clutch pressure detected by the pressure detector (94, 96) is less than the prescribed pressure, determines whether the one of the gear engaging mechanisms (60) operates based on the output of the operating state detector (102, 82, 84, 86), determines that one of the two second pressure-regulating valves (70f, 70g) has failed when the one of the gear engaging mechanisms (60) is determined to be inoperative (S10-S18), whereas determines that at least one from among one the two solenoid valves (70ma, 70na) and the pressure detector (94, 96) has failed when the one of the gear engaging mechanisms (60) is determined to be operative (S20-S26). With this, it becomes possible to identify the source of the failure more promptly and efficiently.

In the apparatus, the failure determiner (74) de-energizes one of the two solenoid valves (70ma, 70na) to supply the gear pressure regulated by one of the two third pressure-regulating valves (70h, 70i) to other of the gear engaging mechanisms (60) by the second shift valve (70o, 70p, 70q)

through the second oil passage when the one of the gear engaging mechanisms (60) is determined to be operative, determines whether the other of the gear engaging mechanisms (60) operates based on the output of the operating state detector (102, 82, 84, 86), determines that the one of the two solenoid valves (70ma, 70na) has failed when the other of the gear engaging mechanisms (60) is determined to be inoperative, whereas determines that the pressure detector (94, 96) has failed when the other of the gear engaging mechanisms (60) is determined to be operative (S20-S26). With this, it becomes possible to determine the failure is solenoid valve 70ma or 70na or the pressure detector 94 or 96, whereby enabling to identify the source of the failure more promptly and efficiently In the apparatus, the failure determiner (74) controls, when any of the gear engaging mechanisms (60) is at in-gear position, the any of the gear engaging mechanisms (60) toward neutral position through the second shift valve (70o, 70p, 70q), determines whether the any of the gear engaging mechanisms (60) has moved to the neutral position based on the output of the operating state detector (102, 82, 84, 86), determines that the one of the two solenoid valves (70ma, 70na) has failed when the any of the gear engaging mechanisms (60) is determined to be immovable, whereas determines that the one of the two solenoid valves (70ma, 70na) is normal when the any of the gear engaging mechanisms (60) is determined to have moved (S100-S110). With this, it becomes possible to identify the source of the failure more promptly and efficiently.

In the apparatus, the automatic transmission comprises a double-clutch automatic transmission having the input shafts (14, 16, 20, 22) that input rotation of the prime mover (10) through the clutches (24, 26), the output shaft (28) arranged in parallel to the input shafts, and the gear engaging mechanisms (60) in m number that engage one of gears (32, ... 54) to the input shafts and the output shaft to establish one of speeds corresponding to the engaged one of the gears from among n (n: 2m) number of speeds. With this, it becomes possible to identify the source of the failure more promptly and efficiently in the double-clutch automatic transmission T.

In the above, the double-clutch transmission in the foregoing is not limited to the illustrated structure and any structure is acceptable insofar as it is equipped with the aforesaid gear engaging mechanism.

While the invention has thus been shown and described with reference to specific embodiment, it should be noted that the invention is in no way limited to the details of the described arrangement; changes and modifications may be made without departing from the scope of the appended claims.

What is claimed is:

1. An apparatus for determining failure of an automatic transmission, comprising:
    input shafts that input rotation of a prime mover through a pair of clutches, the prime mover being mounted on a vehicle;
    an output shaft arranged in parallel to the input shafts;
    gears that are disposed between the input shafts and the output shaft;
    gear engaging mechanisms that engage one of the gears to the input shafts and the output shaft to establish one of speeds corresponding to the engaged one of the gears;
    a first pressure-regulating valve that pressure-regulates hydraulic pressure discharged from an oil pump to line pressure;
    a second pressure-regulating valve that pressure-regulates the line pressure regulated by the first pressure-regulating valve to a clutch engaging pressure for the pair of clutches;
    a third pressure-regulating valve that pressure-regulates the line pressure regulated by the first pressure-regulating valve to gear pressure for the gear engaging mechanisms;
    a first shift valve that has a solenoid valve and outputs the clutch pressure regulated by the second pressure-regulating valve and the gear pressure regulated by the third pressure-regulating valve toward the pair of clutches and the gear engaging mechanisms, when the solenoid valve is de-energized, whereas the clutch pressure regulated by the second pressure-regulating valve is output toward one of the gear engaging mechanisms through a first oil passage when the solenoid valve is energized;
    a second shift valve that selectively supplies the gear pressure outputted from the first shift valve to the gear engaging mechanisms through a second oil passage, the second oil passage being different from the first oil passage;
    an operating state detector that detects an operating state of the gear engaging mechanisms;
    a pressure detector that detects the clutch pressure regulated by the second pressure-regulating valve; and
    a failure determiner that energizes the solenoid valve to output the clutch pressure to the one of the gear engaging mechanisms through the first oil passage when the clutch pressure detected by the pressure detector is less than a prescribed pressure, determines whether the one of the gear engaging mechanisms operates based on an output of the operating state detector, determines that the second pressure-regulating valve has failed when the one of the gear engaging mechanisms is determined to be inoperative, whereas determines that at least one of the solenoid valve and the pressure detector has failed when the one of the gear engaging mechanisms is determined to be operative.

2. The apparatus according to claim 1, wherein the failure determiner that de-energizes the solenoid valve to supply the gear pressure regulated by the third pressure-regulating valve to another of the gear engaging mechanisms by the second shift valve through the second oil passage when the one of the gear engaging mechanisms is determined to be operative, determines whether the other of the gear engaging mechanisms operates based on the output of the operating state detector, determines that the solenoid valve has failed when the other of the gear engaging mechanisms is determined to be inoperative, whereas determines that the pressure detector has failed when the other of the gear engaging mechanisms is determined to be operative.

3. The apparatus according to claim 1, wherein the failure determiner moves, when any of the gear engaging mechanisms is at an in-gear position, the any of the gear engaging mechanisms from the in-gear position toward neutral position through the second shift valve, determines whether the any of the gear engaging mechanisms has moved to the neutral position based on the output of the operating state detector, determines that the solenoid valve has failed when the any of the gear engaging mechanisms is determined to be immovable, whereas determines that the solenoid valve is normal when the any of the gear engaging mechanisms is determined to have moved.

4. The apparatus according to claim 1, wherein the automatic transmission is a double-clutch automatic transmission.

5. The apparatus according to claim 1, wherein the second pressure-regulating valve comprises two valves;
the third pressure-regulating valve comprises two valves;
the first shift valve comprises two valves, the two valves of the first shift valve having the solenoid valves, respectively;
and
the failure determiner energizes one of the two solenoid valves to output the clutch pressure to the one of the gear engaging mechanisms through the first oil passage when the clutch pressure detected by the pressure detector is less than the prescribed pressure, determines whether the one of the gear engaging mechanisms operates based on the output of the operating state detector, determines that one of the two second pressure-regulating valves has failed when the one of the gear engaging mechanisms is determined to be inoperative, whereas determines that at least one of the two solenoid valves and the pressure detector has failed when the one of the gear engaging mechanisms is determined to be operative.

6. The apparatus according to claim 5, wherein the failure determiner de-energizes one of the two solenoid valves to supply the gear pressure regulated by one of the two valves of the third pressure-regulating valve to another of the gear engaging mechanisms by the second shift valve through the second oil passage when the one of the gear engaging mechanisms is determined to be operative, determines whether the other of the gear engaging mechanisms operates based on the output of the operating state detector, determines that the one of the two solenoid valves has failed when the other of the gear engaging mechanisms is determined to be inoperative, whereas determines that the pressure detector has failed when the other of the gear engaging mechanisms is determined to be operative.

7. The apparatus according to claim 5, wherein the failure determiner moves, when any of the gear engaging mechanisms is at in-gear position, the any of the gear engaging mechanisms from the in-gear position toward neutral position through the second shift valve, determines whether the any of the gear engaging mechanisms has moved to the neutral position based on the output of the operating state detector, determines that the one of the two solenoid valves has failed when the any of the gear engaging mechanisms is determined to be immovable, whereas determines that the one of the two solenoid valves is normal when the any of the gear engaging mechanisms is determined to have moved.

* * * * *